United States Patent [19]

Hackett

[11] Patent Number: 5,768,827
[45] Date of Patent: Jun. 23, 1998

[54] VEHICLE WINDOW GUARD FOR PETS

[76] Inventor: Cletus Eugene Hackett, Rte. 3, Box 266, Lone Oak, Tex. 75453

[21] Appl. No.: 846,297

[22] Filed: Apr. 30, 1997

[51] Int. Cl.$^6$ ..................................................... E06B 3/68
[52] U.S. Cl. .................................................. 49/57; 49/50
[58] Field of Search ................................. 49/50, 57, 62, 49/463

[56] References Cited

U.S. PATENT DOCUMENTS

| | | | |
|---|---|---|---|
| 2,568,800 | 9/1951 | Galla | 160/105 |
| 2,803,471 | 8/1957 | Roth | 280/150 |
| 2,864,648 | 12/1958 | Bland | 296/106 |
| 2,992,850 | 7/1961 | Schatzman | 296/44 |
| 3,032,351 | 5/1962 | Lewis | 280/150 |
| 3,053,566 | 9/1962 | Allen | 49/57 X |
| 5,165,188 | 11/1992 | Tsiros | 49/62 X |
| 5,570,542 | 11/1996 | Cameron | 49/463 |

*Primary Examiner*—Jerry Redman
*Attorney, Agent, or Firm*—Rudolf O. Siegesmund

[57] ABSTRACT

A vehicle window guard to keep pets safely within an automotive vehicle comprising an outer frame, at least one horizontal bar, a plurality of vertical bars wherein a number of the interior vertical bars extend past the top of the outer frame and then bend at an angle of approximately ninety degrees away from the outer frame to a point where they again bend upward at an approximate angle of ninety degrees and join with a single horizontal top bar, and the same vertical interior bars extend out away from the frame at an angle of approximately ninety degrees and join with a single horizontal bottom bar. The bent portions of the horizontal members are adapted to be inserted into the top of the vehicle window where the top of the vehicle window frame engages the horizontal portion of the bent bars and the window is rolled up to engage the bottom horizontal portion of the bent bars. The final vertical sections at the top cause the apparatus to be firmly held in place when pressure is applied from the inside. The horizontal members and vertical members provide a plurality of spaces sufficiently small to prevent animals from exiting the vehicle or from getting caught in the openings.

16 Claims, 3 Drawing Sheets

VEHICLE WINDOW GUARD FOR PETS

FIELD OF THE INVENTION

The present invention is directed, in general, to an apparatus for adapting vehicle windows to prevent an animal inside the vehicle from climbing or jumping out of the vehicle through the window while simultaneously allowing the free passage of air into and out of the vehicle through a window without impairing the drivers ability to see through the window.

BACKGROUND OF THE INVENTION

Owners of automotive vehicles who also own animals for pets, particularly dogs, often transport the pets in the vehicle passenger compartment. At times the vehicle owner may desire to leave a window open so that fresh air may enter the vehicle while traveling. Even with air-conditioning, there are occasions when leaving the window open is preferable for the comfort of both the human driver and the animal. If the window is left open, the animal may extend its head out of the vehicle and if an object passes close to the side of the vehicle from which the animals head is protruding the animal may be injured or killed. When the vehicle owner slows down for traffic or slows down and stops for traffic signals the animal may jump out of the vehicle. In particular, there are times when the vehicle owner may want to leave the vehicle unattended for periods of time and leave the animal inside the passenger compartment. This is particularly common when a vehicle owner makes shopping trips. Most stores do not allow pets to come inside. In warm and hot climates, leaving an animal unattended in the passenger compartment can be dangerous to the animal because the temperature in the passenger compartment will rise well above that of the surrounding ambient air. If the vehicle owner leaves the window open, the animal can leave the vehicle through the open window. Opening the window only a small way is not a solution as insufficient air will enter the vehicle passenger compartment. Only by lowering the window sufficiently so that a substantial portion of the window space is left open can air pass sufficiently to prevent the compartment from becoming dangerously hot and potentially lethal to the animal within. Another unacceptable option is to leave the animal in the car with the air-conditioning on. In order for this to be done, the keys must remain in the ignition making the automobile an easy target for car thieves. Moreover, the owner runs the risk of the automobile running out of gasoline. Furthermore, if the vehicle has any exhaust leaks the owner runs the risk of carbon monoxide building up in the stationary vehicle threatening the life of the animal.

There are no available devices for keeping a family pet from exiting the vehicle without permanently adapting the vehicle for transport of animals. Therefore, a need exists for a device that can be easily inserted and removed from the window whenever, transporting an animal or leaving an animal unattended in the automotive vehicle. A need exists for a device that is a single unit so that it can be installed with one hand. A need exists for a device that would be lightweight making installation and removal easy. A lightweight device is further desirable so that the device can be installed using one hand to place the device while the other hand moves the door or window handle to fix the device in position. Moreover, a lightweight device is desirable so that the device can be easily stored inside the vehicle for use when needed.

A need exists for a device that is also strong enough to resist the pressure that may be brought to bear on it by the animal. Furthermore, it must be strong enough to bear the pressure holding it in place while not damaging the vehicle in any way. For example, such a device would fit between the door frame and the window. By rolling the window upwards pressure would be placed on the device to hold it firmly in position. The pressure must be sufficient to hold the device in position even when pressure is exerted from the inside by the animal. Therefore, the device must be strong enough to withstand the pressure created by the window. The device should have some flexibility to exert pressure back against the window and also to absorb the vibrations and pressures transmitted through the vehicle by engine vibration and bumps in the road. The device should be able to contact the inside of the vehicle door without marring the finish. The device should not require maintenance and the best way to achieve this would be to have a device that did not have any moving parts. The device should be weatherproof and resistant to both sun, heat, cold and rain. The device should be inexpensive.

A further need exists for a device that will allow air to pass through the window while preventing the exit of animals while not impeding the drivers view through the window. A further need exists for a device that will not contribute to the raising of the temperature inside the vehicle by the magnifying effect of a translucent material such as lexan or plexiglass. A further need exists for a window insert that can be installed and removed without the use of any other parts which would be required to be affixed to the automobile. In other words, there is no installation or preparation required and no modifications to the vehicle in order to use the device.

Automobile manufacturers now sell automobiles with windows that are of irregular shapes roughly approximating a rectangular section and a triangular section. Since the window is all one piece, when it is rolled down, the space between the window and the door frame is not rectangular but has a rectangular portion and a slanted horizontal open portion. Therefore, a need also exists for a device that can be inserted into the doors of automobiles with such an irregularly shaped window without leaving an unscreened portion.

The prior art teaches that three types of devices have been used in the past. The first type of device disclosed in the past is a window insert that fits within a receiving groove in the window frame of the door and has a groove in the bottom edge for receiving the window. U.S. Pat. No. 5,570,542 issued to Allan Cameron on Nov. 5, 1996 discloses an insert made from Lexan or plexiglass with air holes in the plexiglass. The insert fits within a receiving groove in the window frame of the door and has a groove in the bottom edge for receiving the window. As the number of holes in the plexiglass insert increase the strength of the insert to resist pressure from the animal inside the vehicle will decrease. Moreover, the plexiglass can magnify the suns rays and increase the heat in a stationary vehicle rather than relieving the heat. U.S. Pat. No. 3,032,351 issued to E. R. Lewis on May 1, 1962 discloses a metal frame with metal bars which extend outward from the car body giving some added space. The frame has a grooved section at the bottom for engaging the window and a solid metal section at the top that fits into the groove for receiving the window. The sides of the frame also engage the side grooves for retaining and guiding the window. The frame must be sized for each automobile and does not have a lot of flexibility for variations in the size of the window. Another variation of the first type of device is U.S. Pat. No. 2,568,800 issued to S. J. Galla on Sep. 25, 1951 which discloses a screen insert enclosed in a plastic frame for the purpose of allowing one to sleep in the automobile with the window open for comfort while keeping insects out of the inside of the automobile. The plastic frame engages the window grooves at the top and sides of the window frame and has spring driven clips on the sides to contact the inside of the side window grooves for guiding and retaining the window. The flexible plastic frame is bent slightly to allow engagement of the sides with the side window grooves. The invention must fit the window exactly and thus one version is not adaptable to a large number of window shapes. Moreover, the screen is too weak to contain large pets.

The second type of device disclosed is one with a groove that fits over the vehicle window with independently adjustable bars attached to the bottom section and with grooved sections fixed to the top of each adjustable bar. This type of device is adaptable to windows where the top of the window frame is curved; however, it does not readily adapt to the newer windows discussed above. U.S. Pat. No. 2,803,471 issued to K. P. Roth on Aug. 20, 1957 discloses an auto window guard aimed at children. A base consisting of a grooved section that fits over the portion of the door comprising the outside of the door and the inside of the window run and several horizontal bar sections which are each independently extendable with a short grooved section on top for engagement with the outside surface of the door and the inside of the window grooves at the top of the door. The guard has the advantage of adaptability because each of the horizontal bars are adjustable for windows of varying shapes. The thickness of the bars and the method of engaging the door give strength. However, the device could mar the door finish, would be costly to make, and because it has moving parts, could have maintenance problems and would be costly to manufacture.

The third type of window guard devices are those that require modifications to the automobile. U.S. Pat. No. 2,992,850 issued to Herman Schatzman on Jul. 18, 1961 discloses a guard device to fit inside the window to make the window burglar proof. Its main purpose is not to allow the window to be opened but rather to keep a burglar from smashing the window to gain access to the car. The device requires attachment to the inside of the car door and modifications to the car door for receiving the device. U.S. Pat. No. 2,864,648 issued to D. J. Bland on Dec. 16, 1958 discloses a safety barrier for automobile windows intended for the rear window of station wagon. The frame must be sized to fit the station wagon rear window and attaches by engaging the window groove for the rear window and by interlocking two hook shaped prongs with slots in the top rear cross members of the station wagon.

Therefore, there exists a need for a vehicle window guard for pets that is of one piece, has no moving parts, engages with a large number of window shapes and sizes, is lightweight, weatherproof, capable of insertion with one hand and strong enough that pets cannot force it out of the window.

SUMMARY OF THE INVENTION

An apparatus comprising an outer frame, at least one horizontal bar, a plurality of vertical bars wherein a number of the interior vertical bars then bend away from the top of the outer frame at an angle of approximately ninety degrees away from the outer frame to a point where they bend upward at an approximate angle of ninety degrees and join with a top retainer bar, and the same vertical interior bars bend away from the bottom of the outer frame at an angle of approximately ninety degrees to a point where they bend downward at an approximate angle of ninety degrees and join with a bottom retainer bar. The device is inserted into the vehicle window with one hand and positioned so that the top retainer bar is inside the door frame and bottom retainer bar is inside the window. The window is then rolled up until it contacts the surface of the horizontal portion of the bent bars. The pressure against the bars pushes the device upward so that the bent bars contact the top of the door window frame holding the device in place. When pressure is applied against the device from inside the vehicle the top retainer bar contacts the inside of the vehicle door and the bottom retainer bar contacts the inside of the window preventing the device from moving outward. The horizontal members and vertical members provide a plurality of spaces sufficiently small to prevent animals from exiting the vehicle or from getting caught in the openings. Because the device is one piece it can be inserted in the window with one hand while the other hand lowers or raises the window as necessary to engage the apparatus. The device is coated with polyvinyl chloride, plastic or rubber making the device weatherproof, maintenance free and protecting the finish of the automobile. The device is lightweight, has no moving parts, engages with a large number of window shapes and sizes, is lightweight and weatherproof. The bent vertical elements create a springlike tension with the door frame and the window to absorb vibration from the engine and bumps in the road. The spaces formed between the horizontal and vertical bars are small enough to protect the pets but large enough to allow the driver unimpeded vision through the window. The device will not magnify the suns rays or contribute to heating the inside of the vehicle. No special parts or adaptation of the door is required for installation. Therefore, the apparatus meets all of the needs identified above.

BRIEF DESCRIPTION OF THE DRAWINGS

The apparatus of the invention is further described and explained in relation to the following figures of the drawings wherein.

DESCRIPTION OF PREFERRED EMBODIMENT

Figure 1:
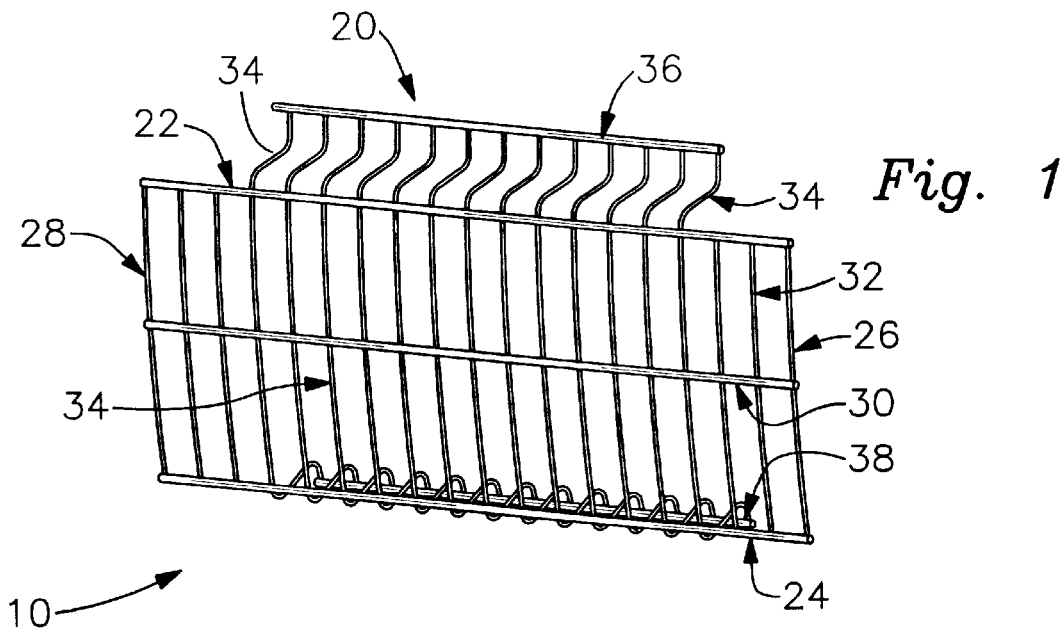
FIG. 1 is an overview of the apparatus.

In the discussion of the figures, the same numbers will be used to refer to the same or similar components throughout. According to the present invention, FIG. 1 depicts the apparatus as configured for standard windows having a generally square or rectangular shape. Apparatus 10 comprises an outer frame 20 consisting of top horizontal frame element 22, bottom horizontal frame element 24, right vertical frame element 26 and left vertical frame element 28. The left end of top horizontal frame element 22 is spot welded to the top end of left vertical frame element 28. The right end of top horizontal frame element 22 is spot welded to the top end of right vertical frame element 26. The left end of bottom horizontal frame element 24 is spot welded to the bottom end of left vertical frame element 28 and the right end of bottom horizontal frame element 24 is spot welded to the bottom end of right vertical frame element 26. The left end of middle horizontal bar 30 is spot welded to left vertical frame element 28 and the right end of middle horizontal bar 30 is spot welded to right vertical frame element 26. The top ends of first vertical bars 32 are spot welded to top horizontal frame element 22 and the bottom end of first vertical bars 32 are spot welded to bottom horizontal frame element 24. First vertical bars 32 are also spot welded to middle horizontal bar 30. The top ends of second vertical bars 34 are spot welded to top retainer bar 36 and the bottom ends of second vertical bars 34 are spot welded to bottom retainer bar 38. Second vertical bars 34 are spot welded to top horizontal frame element 22, bottom horizontal frame element 24 and middle horizontal bar 30. There can be any number of middle horizontal bars 30. The top ends of second vertical bars 34 bend away from top horizontal frame element 22 after the point where they are spot welded to top horizontal frame element 22 and the bend is at an angle of approximately ninety degrees for a distance of not less than one inch and not more than five inches to a point where second vertical bars 34 bend upward at an angle of approximately ninety degrees for a distance of not less than one and not more than five inches to a point where second vertical bars 34 are spot welded to top retainer bar 36. The bottom ends of second vertical bars 34 bend away from bottom horizontal frame element 24 after the point where they are spot welded to bottom horizontal frame element 24 and the bend is at an angle of approximately ninety degrees for a distance of not less than one inch and not more than five inches to a point where second vertical bars 34 bend downward at an angle of approximately ninety degrees for a distance of not less than one inch and not more than five inches to the point where second vertical bars 34 are spot welded to bottom retainer bar 38. In the preferred embodiment of the invention, first vertical bars 32 and the portion of second vertical bars 34 between top horizontal frame element 22 and bottom horizontal frame element 24 have a slight curvature. The purpose of the curvature in first vertical bar 32 is to conform in appearance to second vertical bar 34. The reason for the curvature in second vertical bar 34 is to impart a spring-like tension when the apparatus is installed in the vehicle window. The apparatus 10 has an interior side and an exterior side. The interior side is the side toward which second vertical bars 34 are bent. The portions of second vertical bars 34 that are horizontal provide a surface to contact the inside surface of the top of door window frame 50 and a surface to contact the top of window 5. The interior side of apparatus 10 is the side that will face the inside of the automotive vehicle. The exterior side of apparatus 10 is the side that will face the exterior of the automotive vehicle. The apparatus 10 is constructed so that it can be installed with either top retainer bar 36 or bottom retainer bar 38 at the top of apparatus 10 so long as both top retainer bar 36 and bottom retainer bar 38 are inside door window frame 50 because the top portion of apparatus 10 mirrors the bottom portion of apparatus 10. In the preferred embodiment of the invention spot welding is used to fasten the elements together. All components of the apparatus 10 can be laid out and spot welded at the same time in one step. After the spot welding is performed, the second vertical bars 34 are bent. The curvature of first vertical bars 32 and second vertical bars 34 can be made at the same time as the bending of the portions of second vertical bars 34 between top horizontal frame element 22 and top retainer bar 36 and bottom horizontal frame element 24 and bottom retainer bar 38. The device can also be assembled by welding and stamping processes. In the preferred embodiment 6 gauge steel wire is used for the horizontal members and bars and 12 gauge steel is used for the vertical bars. However, the apparatus can be constructed using any combination of from 3 gauge steel wire to 14 gauge steel wire. The assembled device is then coated with polyvinyl chloride (PVC). The coating is accomplished by dipping the assembled metal device into the compound that is desired as the coating. Additionally, the device can be coated with epoxy paint, rubber or plastic. The purpose of the coating is to make the device weatherproof and also to soften the surfaces of the device which will contact the surface of the automobile and the automobile window. The coating also aids in absorbing engine vibrations and vibrations due to bumps in the road.

Figure 2:
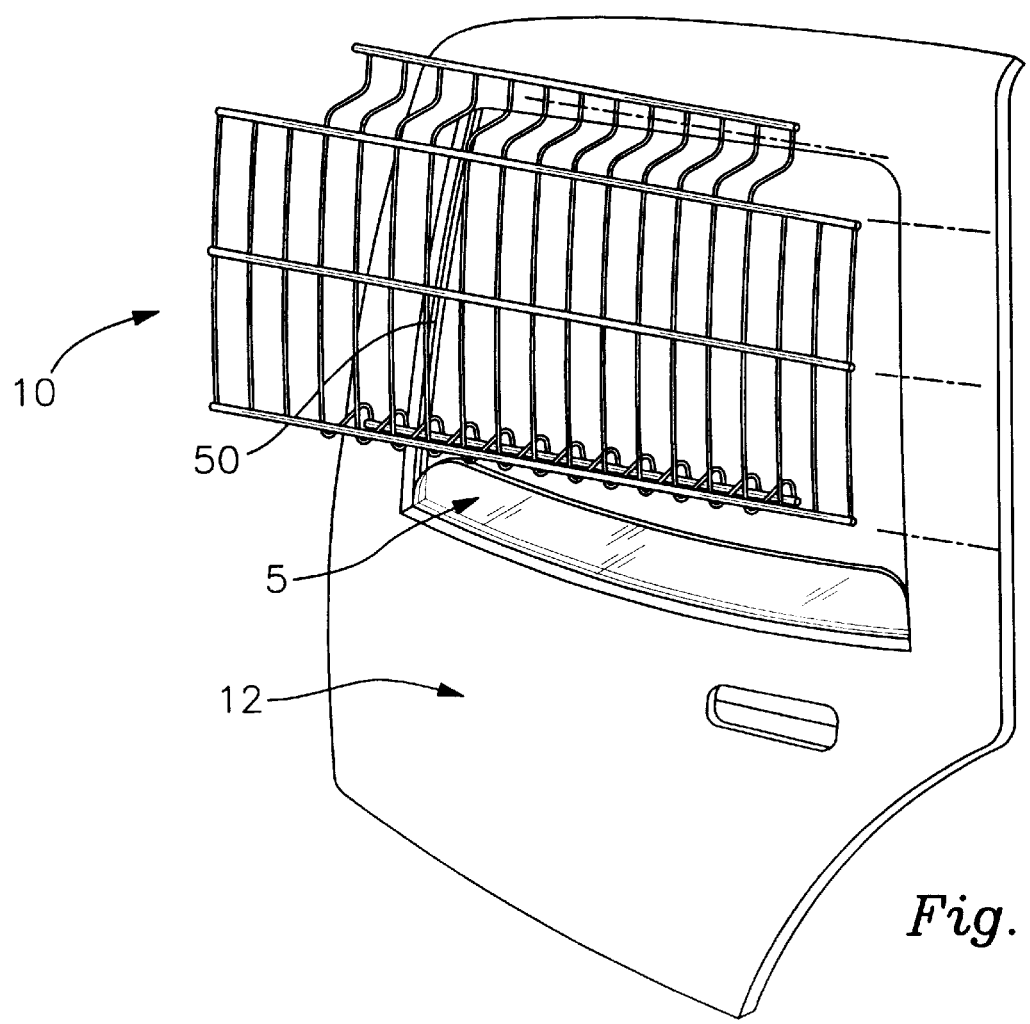
FIG. 2 is a picture of the apparatus as it would go into an automotive vehicle window that is generally square or rectangular.

FIG. 2 depicts the apparatus oriented to be inserted into the window of an automotive vehicle. The top of window 5 engages with the horizontal portion of second vertical bars 34 at the portion where they are bent at a ninety degree angle away from bottom horizontal frame element 24. The top of apparatus 10 engages the top of door window frame 50 with the portion of second vertical bars 32 that are bent at a ninety degree angle away from top horizontal frame element 22. When pressure is placed on apparatus 10 from inside the automobile, top retainer bar 36 will contact the inside of the door window frame 50 and bottom retainer bar 38 will contact the inside surface of window 5. The apparatus 10 can be positioned while being held in one hand while the other hand is used to roll up the window or to drive up the window if the window is motor driven. Apparatus 10 can fit windows varying in size as to length and height because the top horizontal frame element 22 and bottom horizontal frame element 24 extend beyond the door window frame 50. Apparatus 10 is adjustable in the vertical dimension because the window can be adjusted to come in contact with the apparatus 10 by raising the window.

Figure 3:
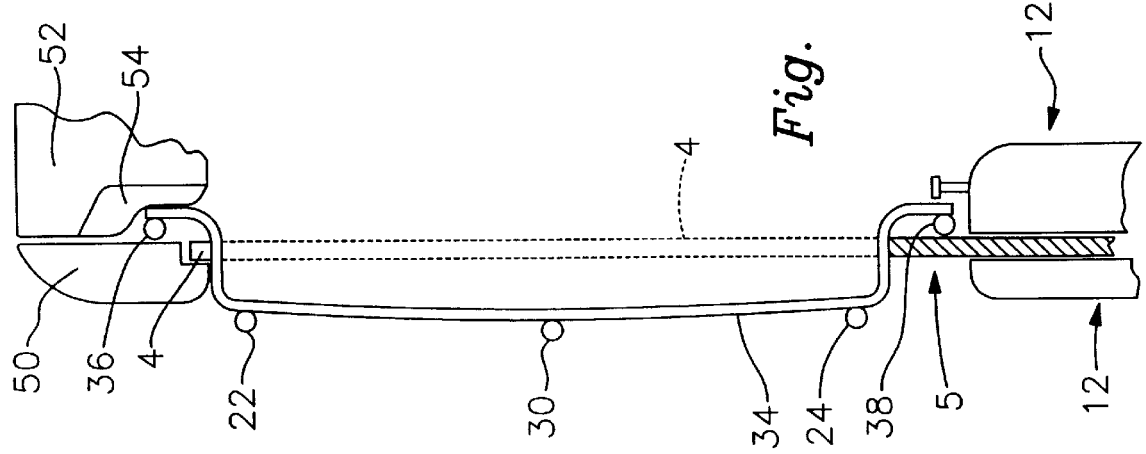
FIG. 3 is cross sectional side view of the apparatus inserted into an automotive vehicle window.

FIG. 3 is a side view of the apparatus inserted into the window frame of door 12. FIG. 3 shows how apparatus 10 contacts window 5 and the upper portion of door window frame 50. Window 5 moves up and down in receiving groove 4. Top retainer bar 36 contacts the inside of door window frame 50 and bottom retainer bar 38 contacts the inside of window 5. Therefore, when pressure is placed on apparatus 10 from inside the automobile, top retainer bar 36 and bottom retainer bar 38 prevent the apparatus 10 from being forced out of position. FIG. 3. depicts the curvature in second vertical bars 34. Second vertical bars 34 act like springs by bending slightly to create tension to keep the apparatus in position and also to absorb vibration. Window 5 contacts the horizontal portion of second vertical bar 34 and as window 5 is raised, apparatus 10 is pushed in contact with door window frame 50. FIG. 3 also shows detail of how top retainer bar 36 is positioned between door window frame 50 and vehicle frame 52. Vehicle frame 52 has a gasket 54 which is attached to a cavity in vehicle frame 52. Some vehicles also have a rubber gasket attached to a cavity on the inside surface of upper door window frame (gasket not shown). Top retainer bar 36 fits between the door window frame 50 and the vehicle frame 52 by fitting in the cavity containing gasket 54 and compressing gasket 54 to make room for top retainer bar 36.

Figure 4:
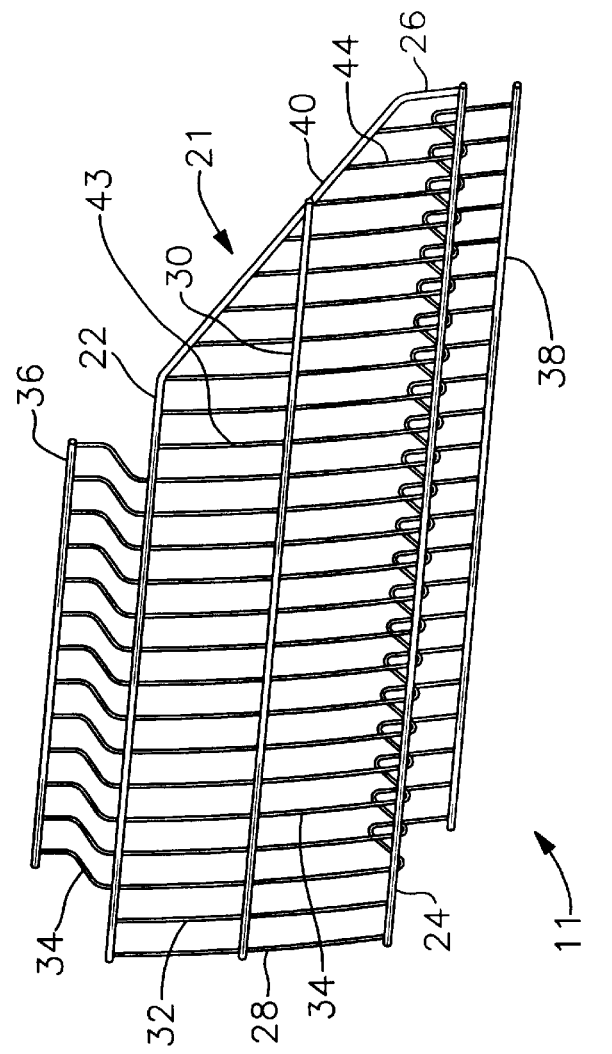
FIG. 4 is a picture of a car door with an irregularly shaped window.

FIG. 4 depicts an embodiment of the apparatus 10 which is configured to adapt to a window of a window style currently being introduced by several major automobile manufacturers. Conventional windows were predominantly square or rectangular in shape. In many instances a square or rectangular window was complemented by a triangular window which had its own frame and which could be opened separately. The new irregular shaped windows combine the square or rectangular window with the triangular window so that the window is constructed of one piece of glass. Such a window shape poses a problem for apparatus 10 because as the window is lowered the space between the window and the door frame is not rectangular. Moreover as the window is further lowered a space is created at the right side of the window. The irregular window presents a problem for the use of apparatus 10 because a gap will be created when the apparatus 10 is installed. Therefore, an additional embodiment of apparatus 10 is designed to cover the additional triangular space created by the irregular windows. Apparatus 11 is constructed in a similar manner to apparatus 10. However, top horizontal frame element 22 is spot welded to slanting frame element 40. Slanting frame element 40 is spot welded to right vertical frame element 26. Apparatus 11 has third vertical bars 43 and fourth vertical bars 44. Third vertical bars 43 are spot welded to horizontal frame element 22, middle horizontal bar 30, bottom horizontal frame element 24 and bottom retainer bar 38. Third vertical bars 43 do not extend beyond top horizontal frame element 22. Third vertical bars 43 do extend outward and downward in the same manner as second vertical bars 32 after the point where third vertical bars 43 are spot welded to bottom horizontal frame element 24. Fourth vertical bars 44 are spot welded to slanting horizontal frame element 40, middle horizontal bar 30, bottom horizontal frame element 24 and bottom retainer bar 38. Fourth vertical bars 44 do not extend beyond slanting horizontal frame element 40 while fourth vertical bars 44 do extend outward and downward in the same manner as second vertical bar 32 after the point where fourth vertical bars 44 are spot welded to bottom horizontal frame element 24.

The apparatus 11 comprises a modified outer frame 21 consisting of top horizontal frame element 22, slanting frame element 40, bottom horizontal frame element 24, right vertical frame element 26 and left vertical frame element 28. The left end of top horizontal frame element 22 is spot welded to the top end of left vertical frame element 28. The right end of top horizontal frame element 22 is spot welded to the left end of slanting horizontal frame element 40. The right end of slanting horizontal frame element 40 is spot welded to the top end of right vertical frame element 26. The left end of bottom horizontal frame element 24 is spot welded to the bottom end of left vertical frame element 28 and the right end of bottom horizontal frame element 24 is spot welded to the bottom end of right vertical frame element 26. The left end of middle horizontal bar 30 is spot welded to left vertical frame element 28 and the right end of middle horizontal bar 30 is spot welded to slanting horizontal frame element 40. The top ends of first vertical bars 32 are spot welded to top horizontal frame element 22 and the bottom ends of first vertical bars 32 are spot welded to bottom horizontal frame element 24. The top ends of second vertical bars 34 are spot welded to top retainer bar 36 and the bottom end of second vertical bars 34 are spot welded to bottom retainer bar 38. Second vertical bars 34 are spot welded to top horizontal frame element 22, bottom horizontal frame element 24 and middle horizontal bar 30. The top ends of second vertical bars 34 bend away from top horizontal frame element 22 after the point where second vertical bars 34 are spot welded to top horizontal frame element 22 at an angle of approximately ninety degrees for a distance of not less than one inch and not more than five inches to a point where second vertical bars 34 bend upward at an angle of approximately ninety degrees for a distance of not less than one and not more than five inches to a point where second vertical bars 34 are spot welded to top retainer bar 36. The bottom ends of second vertical bars 34 bend away from bottom horizontal frame element 24 after the point where second vertical bars 34 are spot welded to bottom horizontal frame element 24 at an angle of approximately ninety degrees for a distance of not less than one inch and not more than five inches to a point where second vertical bars 34 bend downward at an angle of approximately ninety degrees for a distance of not less than one inch and not more than five inches to the point where second vertical bars 34 are spot welded to bottom retainer bar 38.

Third vertical bars 43 are spot welded to top horizontal frame element 22, bottom horizontal frame element 24 and middle horizontal bar 30. The top ends of third vertical bars 43 are spot welded to top horizontal frame element 22. The bottom ends of third vertical bars 43 bend away from bottom horizontal frame element 24 after the point where third vertical bars 43 are spot welded to bottom horizontal frame element 24 at an angle of approximately ninety degrees for a distance of not less than one inch and not more than five inches to a point where third vertical bars 43 bend downward at an angle of approximately ninety degrees for a distance of not less than one inch and not more than five inches to the point where third vertical bars 43 are spot welded to a bottom retainer bar 38.

Fourth vertical bars 44 are spot welded to slanting horizontal frame element 40, bottom horizontal frame element 24 and middle horizontal bar 30. The top ends of fourth vertical bars 43 are spot welded to slanting horizontal frame element 40. The bottom ends of fourth vertical bars 44 bend away from bottom horizontal frame element 24 after the point where fourth vertical bars 44 are spot welded to bottom horizontal frame element 24 at an angle of approximately ninety degrees for a distance of not less than one inch and not more than five inches to a point where fourth vertical bars 44 bend downward at an angle of approximately ninety degrees for a distance of not less than one inch and not more than five inches to the point where fourth vertical bars 44 are spot welded to bottom retainer bar 38.

Apparatus 11 has an interior side and an exterior side. The interior side is the side toward which second vertical bars 34 are bent to meet bottom retainer bar 38. The interior side of apparatus 11 is the side that will face the inside of the automobile. Apparatus 11 is constructed so that it can only be installed in the window on the side of the vehicle that is opposite the driver's window. The window for which apparatus 11 is designed is commonly referred to as the passenger side window. In the preferred embodiment of the invention apparatus 11 is constructed of steel wire and spot welding is used to fasten the elements together. In the preferred embodiment 6 gauge steel wire is used for the horizontal members and bars and 12 gauge steel wire is used for the vertical bars. However, the apparatus can be consructed using any combination of from 3 gauge steel wire to 14 gauge steel wire. The device can also be assembled by welding and stamping processes. The assembled device is then coated with polyvinyl chloride (PVC). Additionally, the device can be coated with epoxy paint, rubber or plastic. The purpose of the coating is to make the device weatherproof and also to soften the surfaces of the device which will contact the surface of the automobile and the automobile window. The coating also aids in absorbing engine vibrations and vibrations due to bumps in the road.

To further adapt apparatus 11 to irregular shaped windows, top horizontal frame member 22 can have a slight downward slope. In other words, the right end of top horizontal frame member 22 can drop a distance of a maximum of 1 inch over 14 inches to a minimum of 1 inch over 20 inches to accomodate adapting apparatus 11 to some irregularly shaped windows.

Figure 5:
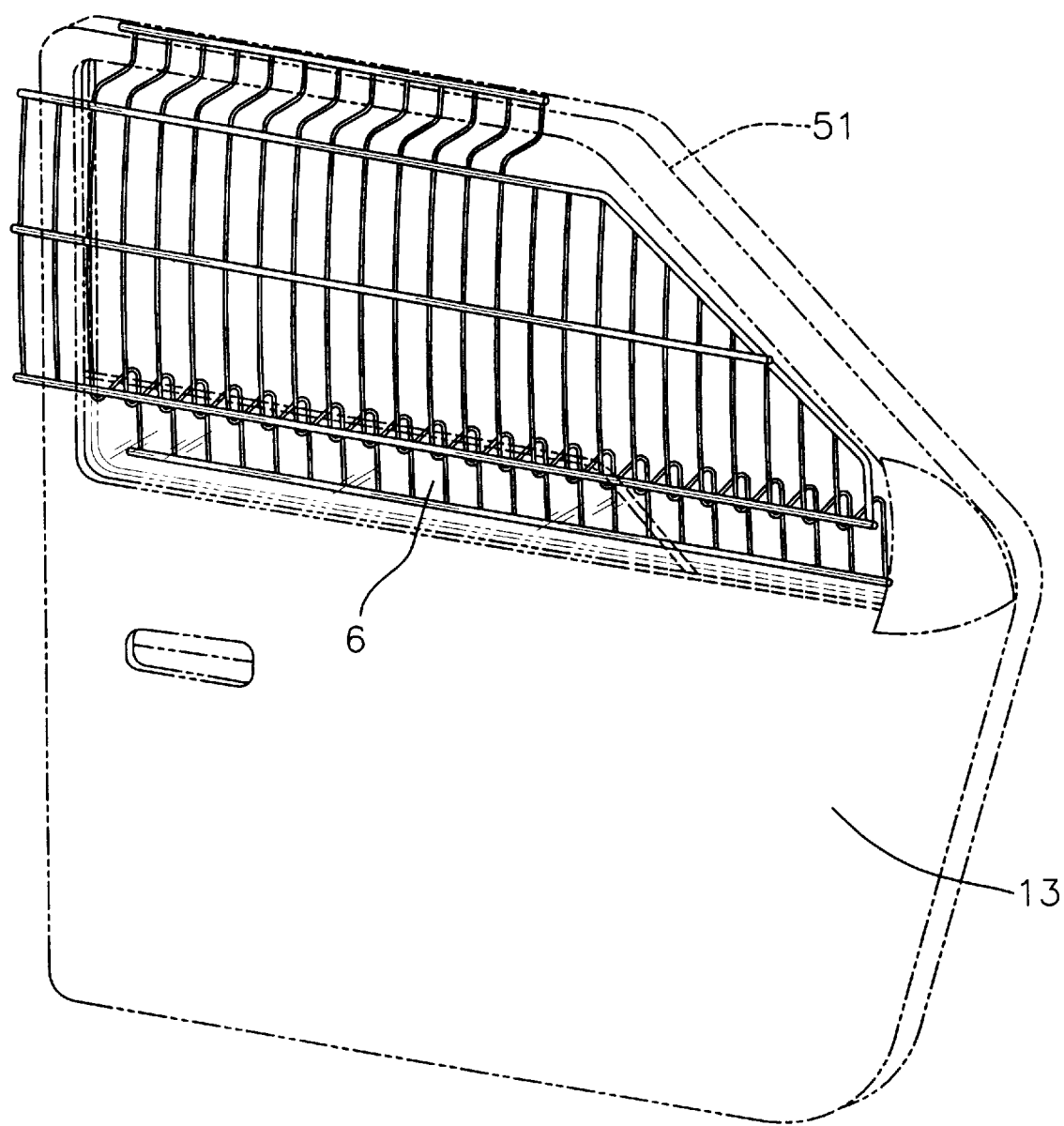
FIG. 5 is a depiction of the apparatus adapted to the type of window depicted in FIG. 4.

FIG. 5 depicts the installation of apparatus 11 in door 13 having an irregularly shaped window 6. The portion of apparatus 11 comprising third vertical bars 43 and fourth vertical bars 44 below the level of bottom horizontal frame element 24 act as the portion of the guard to cover the gap between the irregularly shaped window and the vehicle door frame.

Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims. Other alternatives and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

What is claimed:

1. A vehicle window guard for an automotive vehicle having door windows defined by a door and a door window frame containing a window which is guided into a receiving groove comprising;
   (1) An outer frame;
   (2) a plurality of middle horizontal bars fixedly engaged to said outer frame;
   (3) a plurality of first vertical bars fixedly engaged to said outer frame and said middle horizontal bars;
   (4) a plurality of second vertical bars fixedly engaged to said outer frame and said middle horizontal bars;
   (5) a to retainer bar fixedly engaged to said second vertical bars; and
   (6) a bottom retainer bar fixedly engaged to said second vertical bars;
   wherein said second vertical bars have a top portion and a bottom portion and wherein said second vertical bars are fixedly engaged to said outer frame and wherein the top portion of said second vertical bars bend away from the outer frame at an angle of approximately ninety degrees for a distance of one to five inches and then bend upward at an angle of approximately ninety degrees for a distance of one to five inches to the point where said second vertical bar is fixedly engaged to said top retainer bar and wherein the bottom portion of said second vertical bars bend away from the outer frame at an angle of approximately ninety degrees for a distance of one to five inches and then bend downward at an angle of approximately ninety degrees for a distance of one to five inches to the point where said second vertical bars are fixedly engaged to said bottom retainer bar.

2. The vehicle window guard of claim 1 wherein the outer frame comprises:
   (a) a top horizontal frame element fixedly engaged to a left vertical frame element and a right vertical frame element; and
   (b) a bottom horizontal frame element fixedly engaged to said left vertical frame element and said right vertical frame element.

3. The vehicle window guard of claim 1 wherein the vehicle window guard is constructed of steel and steel alloys.

4. The vehicle window guard of claim 1 wherein the vehicle window guard is constructed of metal coated with one of PVC, polyvinyl chloride, epoxy paint, rubber and plastic.

5. The vehicle window guard of claim 1 wherein the vehicle window guard is assembled by means of spot welding.

6. The vehicle window guard of claim 1 wherein the left and right vertical frame elements and the first and second vertical bars are curved slightly.

7. A guard for an automotive vehicle having door windows defined by a door and a door window frame containing a window which is guided into a receiving groove comprising;
   (1) An outer frame consisting of a top horizontal frame element having a left end and a right end; a bottom horizontal frame element having a left end and a right end; a right vertical frame element having a top end and a bottom end; a left vertical frame element having a top end and a bottom end; wherein the left end of said top horizontal frame element is fixedly engaged to the top end of said left vertical frame element, the right end of said top horizontal frame element is fixedly engaged to the top end of said right vertical frame element, the left end of said bottom horizontal frame element is fixedly engaged to the bottom end of said left vertical frame element and the right end of said bottom vertical frame element is fixedly engaged to the bottom end of said right vertical frame element;
   (2) a plurality of middle horizontal bars having a right end and a left end wherein the left ends of said middle horizontal bars are fixedly engaged to said left vertical bar and the right ends of said middle horizontal bars are fixedly engaged to said right vertical bar;
   (3) a plurality of first vertical bars having a top end and a bottom end wherein the top end of said first vertical bar is fixedly engaged to said top horizontal bar and the bottom end of said first vertical bar is fixedly engaged to said bottom vertical bar;
   (4) a plurality of second vertical bars having a top end and bottom end wherein said top end is fixedly engaged to a top retainer bar and said bottom end is fixedly engaged to a bottom retainer bar and further wherein said second vertical bar is fixedly engaged to said top horizontal frame element, said bottom horizontal frame element and said middle horizontal bar and wherein the portion of said second vertical bar between the point where said second vertical bar is fixedly engaged to said top horizontal frame element bends away from the top horizontal frame element at an angle of approximately ninety degrees for a distance of one to five inches and then bends upward at an angle of approximately ninety degrees for a distance of one to five inches to the point where said second vertical bar is fixedly engaged to a top retainer bar and wherein the portion of said second vertical bar between the point where said second vertical bar is fixedly engaged to said bottom horizontal frame element bends away from the bottom horizontal frame element at an angle of approximately ninety degrees for a distance of one to five inches and then bends downward at an angle of approximately ninety degrees for a distance of one to five inches to the point where said second vertical bar is fixedly engaged to a bottom retainer bar;
   (5) a top retainer bar fixedly engaged to the top end of said second vertical bars; and
   (6) a bottom retainer bar fixedly engaged to the bottom end of said second said vertical bar.

8. The guard of claim 7 wherein the guard is constructed of steel and steel alloys.

9. The guard of claim 7 wherein the guard is constructed of metal coated with one of PVC, polyvinyl chloride, epoxy paint, rubber and plastic.

10. The guard of claim 7 wherein the guard is assembled by means of spot welding.

11. The guard of claim 7 wherein the left and right vertical frame elements and the first and second vertical bars are curved slightly.

12. A guard for an automotive vehicle having door windows defined by a door and a door window frame containing a window which is guided into a receiving groove comprising;

(1) a modified outer frame consisting of a top horizontal frame element having a left end and a right end; a bottom horizontal frame element having a left end and a right end; a slanting frame element having a left end and a right end; a right vertical frame element having a top end and a bottom end; a left vertical frame element having a top end and a bottom end; wherein said left end of said top horizontal frame element is fixedly engaged to the top end of said left vertical frame element, the right end of said top horizontal frame element is fixedly engaged to the right end of said slanting frame element, the left end of said slanting frame element is fixedly engaged to the right vertical frame element, the left end of said bottom horizontal frame element is fixedly engaged to the bottom end of said left vertical frame element and the right end of said bottom vertical frame element is fixedly engaged to the bottom end of said right vertical frame element;

(2) a plurality of middle horizontal bars having a right end and a left end wherein the left ends of said middle horizontal bars are fixedly engaged to said left vertical bar and the right ends of said middle horizontal bars are fixedly engaged to said right vertical bar;

(3) a plurality of first vertical bars having a top end and a bottom end wherein the top end of said first vertical bar is fixedly engaged to said top horizontal bar and the bottom end of said first vertical bar is fixedly engaged to said bottom vertical bar;

(4) a plurality of second vertical bars having a top end and bottom end wherein said top end is fixedly engaged to a top retainer bar and said bottom end is fixedly engaged to a bottom retainer bar and further wherein said second vertical bar is fixedly engaged to said top horizontal frame element, said bottom horizontal frame element and said middle horizontal bar and wherein the portion of said second vertical bar between the point where said second vertical bar is fixedly engaged to said top horizontal frame element bends away from the top horizontal frame element at an angle of approximately ninety degrees for a distance of one to five inches and then bends upward at an angle of approximately ninety degrees for a distance of one to five inches to the point where said second vertical bar is fixedly engaged to a top retainer bar and wherein the portion of said second vertical bar between the point where said second vertical bar is fixedly engaged to said bottom horizontal frame element bends away from the bottom horizontal frame element at an angle of approximately ninety degrees for a distance of one to five inches and then bends downward at an angle of approximately ninety degrees for a distance of one to five inches to the point where said second vertical bar is fixedly engaged to a bottom retainer bar;

(5) a plurality of third vertical bars having a top end and a bottom end wherein the top end of said fourth vertical bar is fixedly engaged to said top horizontal frame element and the bottom end of said third vertical bar is fixedly engaged to said bottom retainer bar; further wherein said third vertical bar is fixedly engaged to said bottom horizontal frame element and bends away from the bottom horizontal frame element at an angle of approximately ninety degrees for a distance of one to five inches and then bends downward at an angle of approximately ninety degrees for a distance of one to five inches to the point where said third vertical bar is fixedly engaged to said bottom retainer bar;

(6) a plurality of fourth vertical bars having a top end and a bottom end wherein the top end of said fourth vertical bar is fixedly engaged to said slanting frame element and the bottom end of said third vertical bar is fixedly engaged to said bottom retainer bar; further wherein said third vertical bar is fixedly engaged to said bottom horizontal frame element and bends away from the bottom horizontal frame element at an angle of approximately ninety degrees for a distance of one to five inches and then bends downward at an angle of approximately ninety degrees for a distance of one to five inches to the point where said third vertical bar is fixedly engaged to said bottom retainer bar;

(7) a top retainer bar fixedly engaged to the top end of said second vertical bars; and (8) a bottom retainer bar fixedly engaged to the bottom end of said second said second vertical bars, said third vertical bars and said fourth vertical bars.

13. The guard of claim 12 wherein the guard is constructed of steel and steel alloys.

14. The guard of claim 12 wherein the guard is constructed of metal coated with one of PVC, polyvinyl chloride, epoxy paint, rubber and plastic.

15. The guard of claim 12 wherein the guard is assembled by means of spot welding.

16. The guard of claim 12 wherein the left and right vertical frame elements and the first vertical bars, second vertical bars, third vertical bars and fourth vertical bars are curved slightly.

* * * * *